F. LJUNGSTRÖM.
LOCOMOTIVE AND SIMILAR VEHICLE.
APPLICATION FILED NOV. 26, 1920.
1,365,595. Patented Jan. 11, 1921.
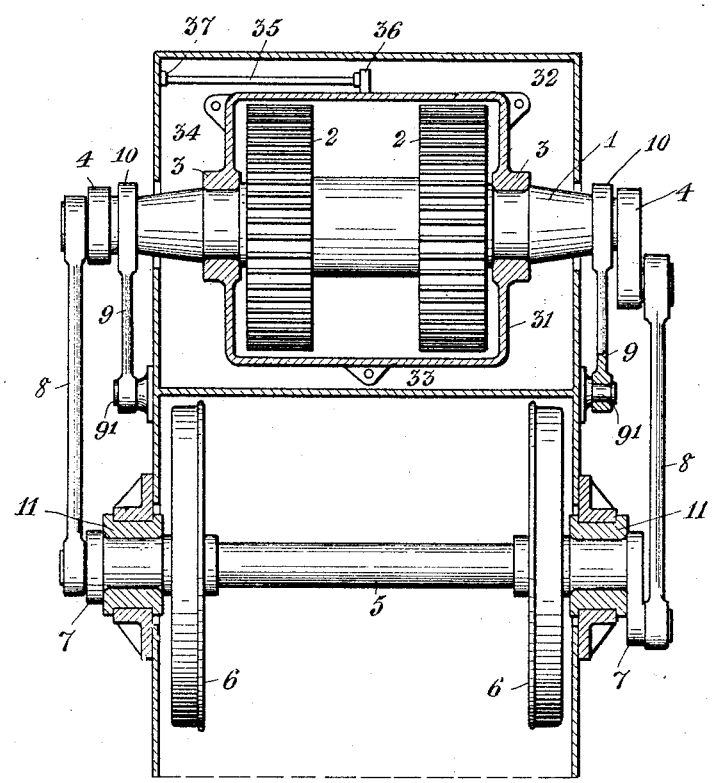
Inventor
F. Ljungström
By H. R. Kerslake
Atty.

UNITED STATES PATENT OFFICE.

FREDRIK LJUNGSTRÖM, OF BREVIK, LIDINGÖN, SWEDEN, ASSIGNOR TO AKTIEBOLAGET LJUNGSTRÖMS ANGTURBIN, ARSENALSGATEN 2, OF STOCKHOLM, SWEDEN, A CORPORATION.

LOCOMOTIVE AND SIMILAR VEHICLE.

1,365,595. Specification of Letters Patent. Patented Jan. 11, 1921.

Original application filed April 1, 1919, Serial No. 286,797. Divided and this application filed November 26, 1920. Serial No. 426,569.

*To all whom it may concern:*

Be it known that I, FREDRIK LJUNGSTRÖM, chief engineer, subject of the King of Sweden, residing at Brevik, Lidingön, Sweden, have invented certain new and useful Improvements in Locomotives and Similar Vehicles, of which the following is a specification.

This is a divisional application from application 286,797, filed April 1, 1919.

The present invention relates to an arrangement in locomotives and similar vehicles of that class in which the driving force of the engine is transmitted to the driving wheels by means of toothed gearings and a crank shaft.

The invention is chiefly characterized by this that a framework which supports one of said toothed gearings is slidably mounted and connected with the crank shaft of the vehicle supporting toothed wheels.

By this arrangement it is to be observed that the stresses exerted by the driving gear or connecting rods on the crank shaft do not interfere with the engagement of said gearings, because of the movements of the crank shaft effected by said stresses being transmitted to the framework supporting the toothed gearings so that mutual movements of the toothed wheels are prevented.

One embodiment of the invention is illustrated in the accompanying drawing showing a horizontal section of a portion of a locomotive.

1 designates the crank shaft supporting a double toothed wheel 2. This shaft is journaled directly or indirectly in bearings 10 and ends in cranks 4 transmitting the power to the wheel axle 5 by means of connecting rods 8 and cranks 7. This shaft 5 on which the driving wheels 6 are mounted is journaled in bearings 11 which in the present construction are rigidly connected with the frame. Each bearing 10 is movably attached to the framework in any suitable manner, for instance by means of a link 9 pivotally journaled on a pin 9'. The spur gearing shaft 1 is journaled in bearings 3 rigidly connected with a framework 31. This framework into which the spur gearing 2 and the toothed wheel or wheels driving the same are mounted is fitted at the points 32, 33 and 34 in such manner that it is somewhat movable about in a horizontal plane. The connecting rod 35 rigidly connected at 37 with the frame only permits the framework 31 to slide in such manner that the joint 36 moves through a circular arc struck with 37 as a center.

If desired the supporting links 9 may be constructed so as to support the springs of the vehicle.

If forces be produced tending to bend the shaft 1 the latter will move the framework 31 together with the whole gearing as far as the clearance existing in the bearings 10 permits, so that the toothed wheels and pinions meshing with each other will maintain their relative position.

What I claim as new and desire to secure by Letters Patent of the United States is:—

In locomotives and similar vehicles of that type in which the driving force of the engine is transmitted to the driving wheels by means of toothed gearings and a crank shaft, a movable framework for supporting said toothed gearings and connected with the crank shaft of the vehicle.

In testimony whereof I affix my signature in presence of two witnesses.

FREDRIK LJUNGSTRÖM.

Witnesses:
 STINER LARSON,
 CARL BONDY.